(12) United States Patent
Nemec

(10) Patent No.: US 6,354,681 B1
(45) Date of Patent: Mar. 12, 2002

(54) COMPUTER CASING

(75) Inventor: Frederick James Nemec, Tustin, CA (US)

(73) Assignee: Lite-On Enclosure Inc., Taipei (TW)

( * ) Notice: Subject to any disclaimer, the term of this patent is extended or adjusted under 35 U.S.C. 154(b) by 0 days.

(21) Appl. No.: 09/619,272

(22) Filed: Jul. 19, 2000

(51) Int. Cl.7 .............................................. A47B 97/00
(52) U.S. Cl. ................... 312/223.2; 312/265.6
(58) Field of Search .......................... 312/223.1, 223.2, 312/8.14, 8.15, 109, 208.3, 257.1, 265.6, 293.3, 295; 211/26; 361/724, 683; 220/4.02

(56) References Cited

U.S. PATENT DOCUMENTS

| | | | | |
|---|---|---|---|---|
| 4,230,381 A | * | 10/1980 | Rhoades | 312/295 |
| 5,711,587 A | * | 1/1998 | Takahashi et al. | 312/265.6 |
| 6,039,414 A | * | 3/2000 | Melane et al. | 312/223.1 X |
| 6,099,092 A | * | 8/2000 | Uffner et al. | 312/263 X |
| 6,102,501 A | * | 8/2000 | Chen et al. | 312/223.2 |

FOREIGN PATENT DOCUMENTS

GB 1293826 * 10/1972 ............... 312/208.3

* cited by examiner

Primary Examiner—James O. Hansen
(74) Attorney, Agent, or Firm—Rosenberg, Klein & Lee

(57) ABSTRACT

A computer casing is disclosed. At least one movable door plate is installed at one side of the computer casing, the movable door plate includes a first plate and a second plate. One edges of the first plate is pivotally connected to one edge of the second plate, and other edges of the first plate and the second plate are formed with engaged portions, respectively. At least one side of the computer casing is installed with an opening; and the engaged portions of the first plate and the second plate are embedded on edges of the opening of the computer casing for selectively closing the opening.

2 Claims, 5 Drawing Sheets

COMPUTER CASING

FIELD OF THE INVENTION

The present invention relates to a computer casing, and especially to an improved computer casing structure, in which the maintenance, updating and expanding works can be performed easily.

BACKGROUND OF THE INVENTION

The most important elements of a computer are a CPU, memories, chip sets, interface cards, etc. These elements are installed in a mother board 10a (as shown in FIG. 1) which is mounted within the computer casing. Since the most important elements of a computer are disposed in the computer casing, the maintenance, updating and expanding of the elements are inevitable. However, in prior art, the computer casing 10a has a fixed design and a large amount of screws 11a are necessary for combining the frames. This cause the attaching and detaching of the computer casing to be difficult and further the maintenance, updating and expanding of the elements become inconvenient.

SUMMARY OF THE INVENTION

Accordingly, the primary object of the present invention is to provide a computer casing. One side of the computer casing is installed with a movable door plate for opening the computer. The movable door plate of the computer casing according to the present invention has a movable design, which can be opened quickly for maintaining, updating and expanding the elements within the computer.

the primary object of the present invention is to provide a computer casing. The movable door plate in the computer casing is fixed by embedding without any screw for locking and combining, and thus, the assembly and detaching works are easily and the maintaining, updating and expanding of the elements within the compute are easy.

In order to achieve the aforesaid object, a computer casing is disclosed. At least one movable door plate is installed at one side of the computer casing, the movable door plate includes two plates. The two plates are further formed with engaged portions, respectively. At least one side of the computer casing is installed with an opening; and the engaged portions of the first plate and the second plate are embedded on edges of an opening of the computer casing for selectably closing the opening.

The various objects and advantages of the present invention will be more readily understood from the following detailed description when read in conjunction with the appended drawing.

DETAILED DESCRIPTION OF THE PREFERRED EMBODIMENTS

Figure 1:
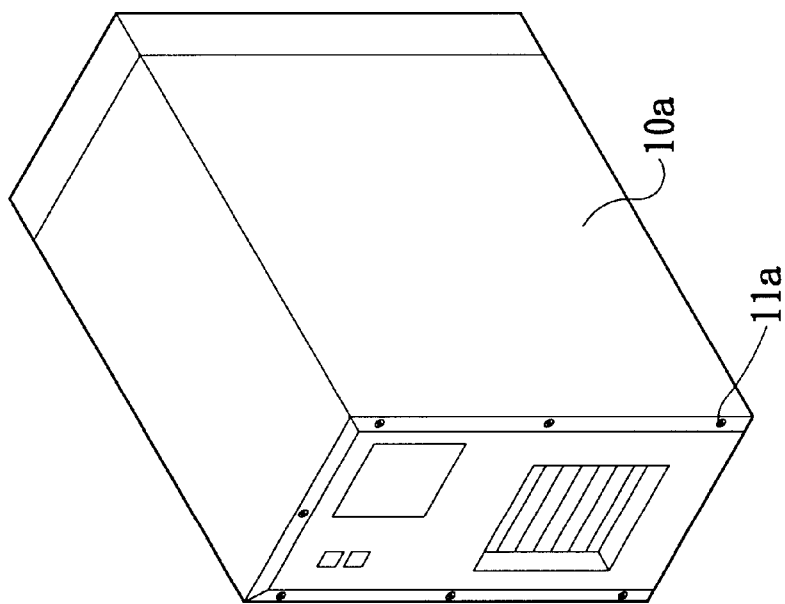
FIG. 1 is a perspective view of a prior art computer casing.
Figure 2:
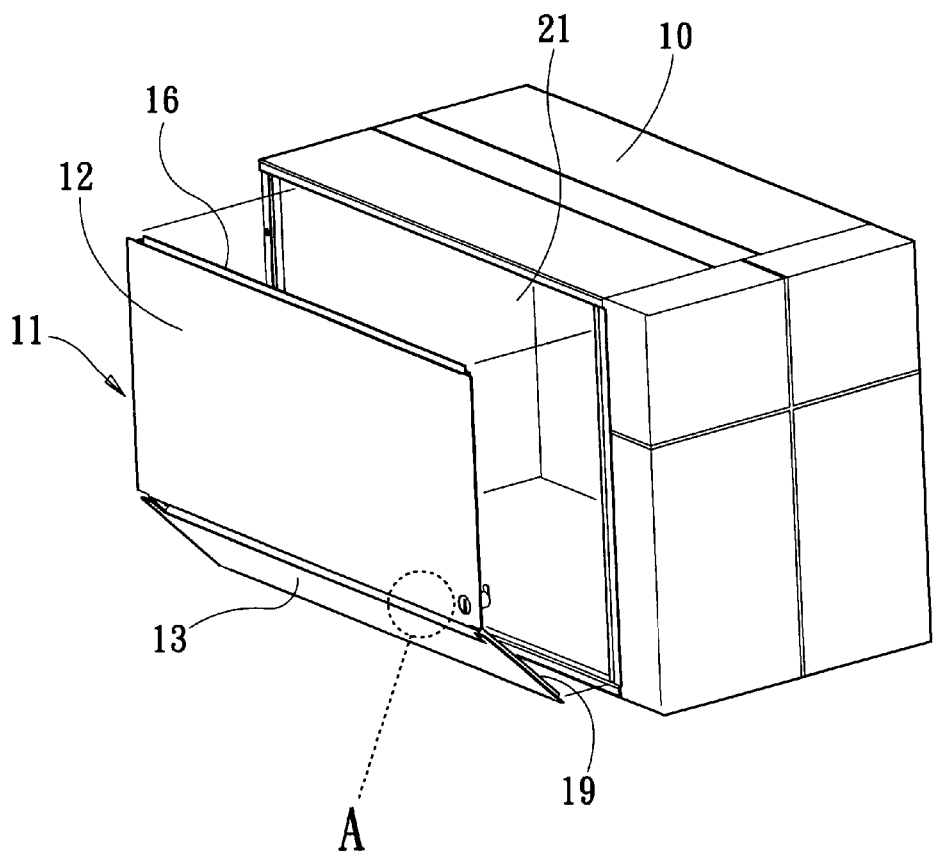
FIG. 2 is a perspective view showing an opening movable door plate according to the present invention.
Figure 2A:
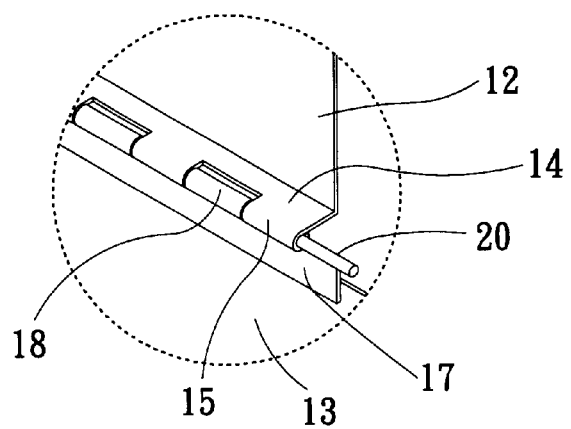
Figure 3:
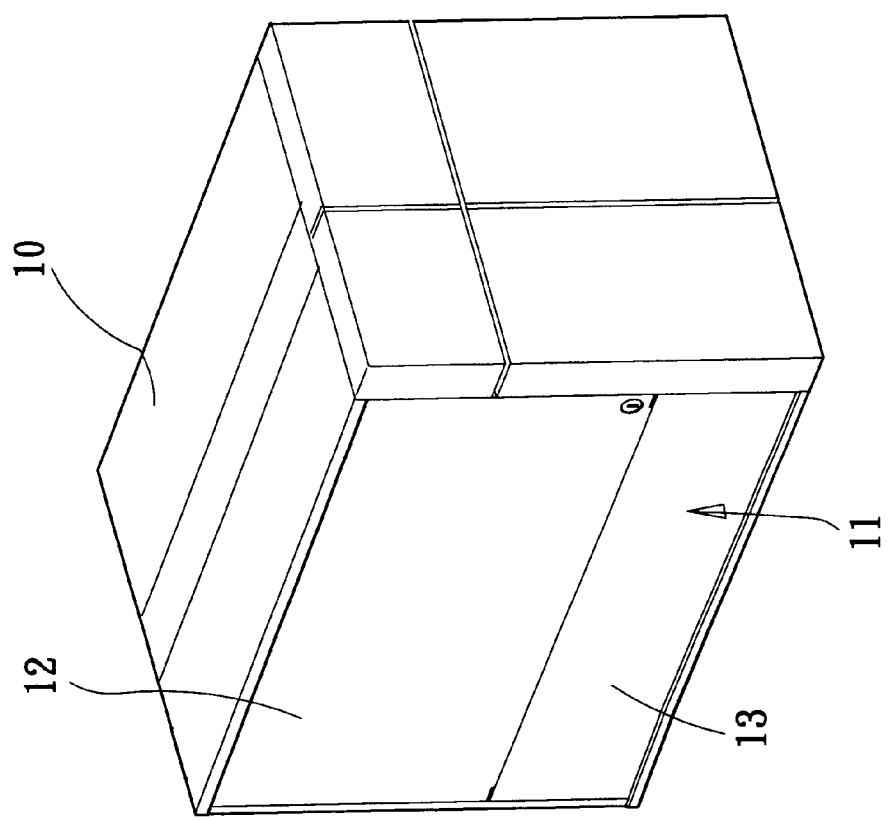
FIG. 3 is a perspective view showing a closing movable door plate according to the present invention.
Figure 4:
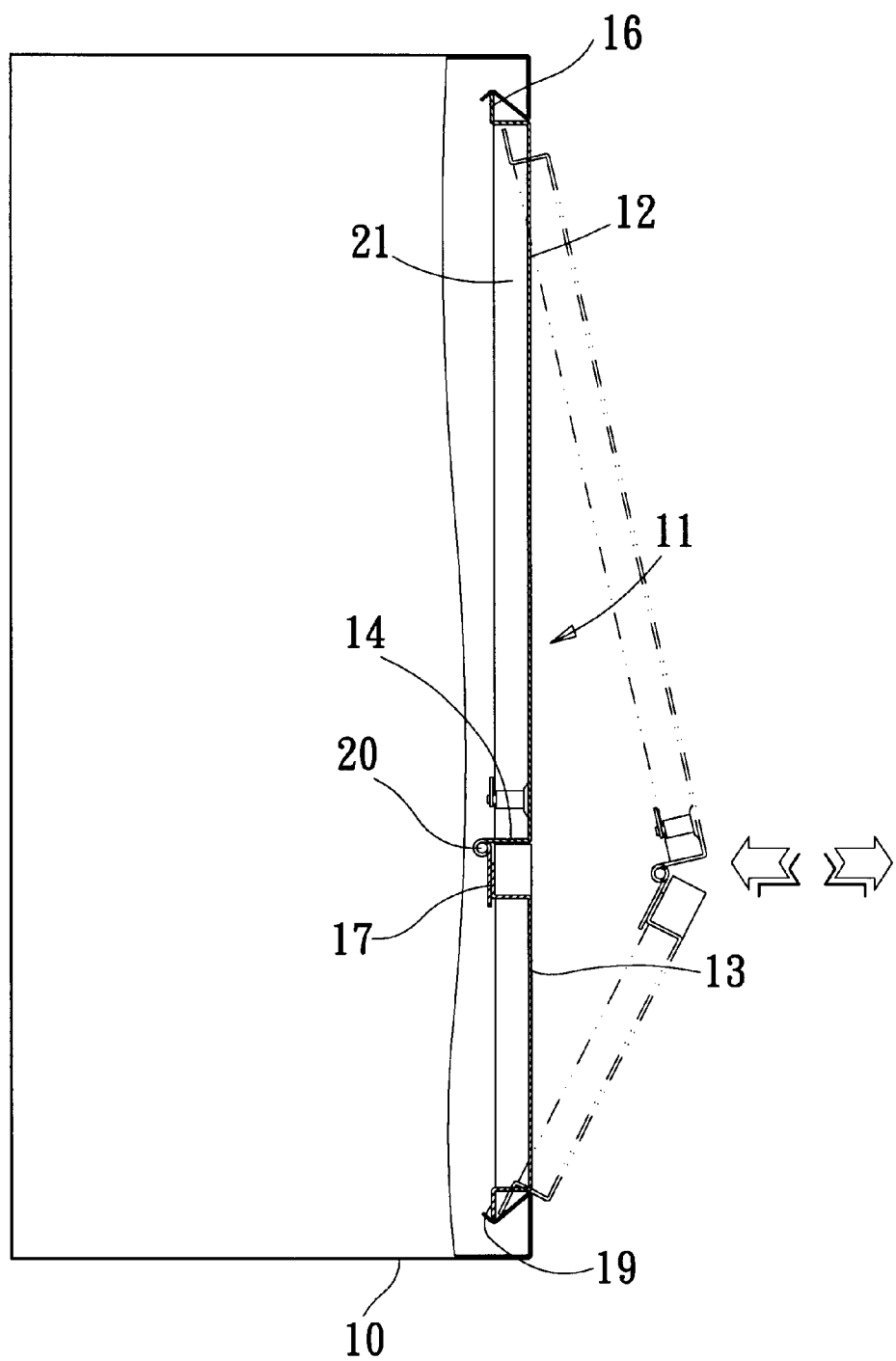
FIG. 4 is a plane view showing a closing movable door plate in the present invention.
Figure 5:
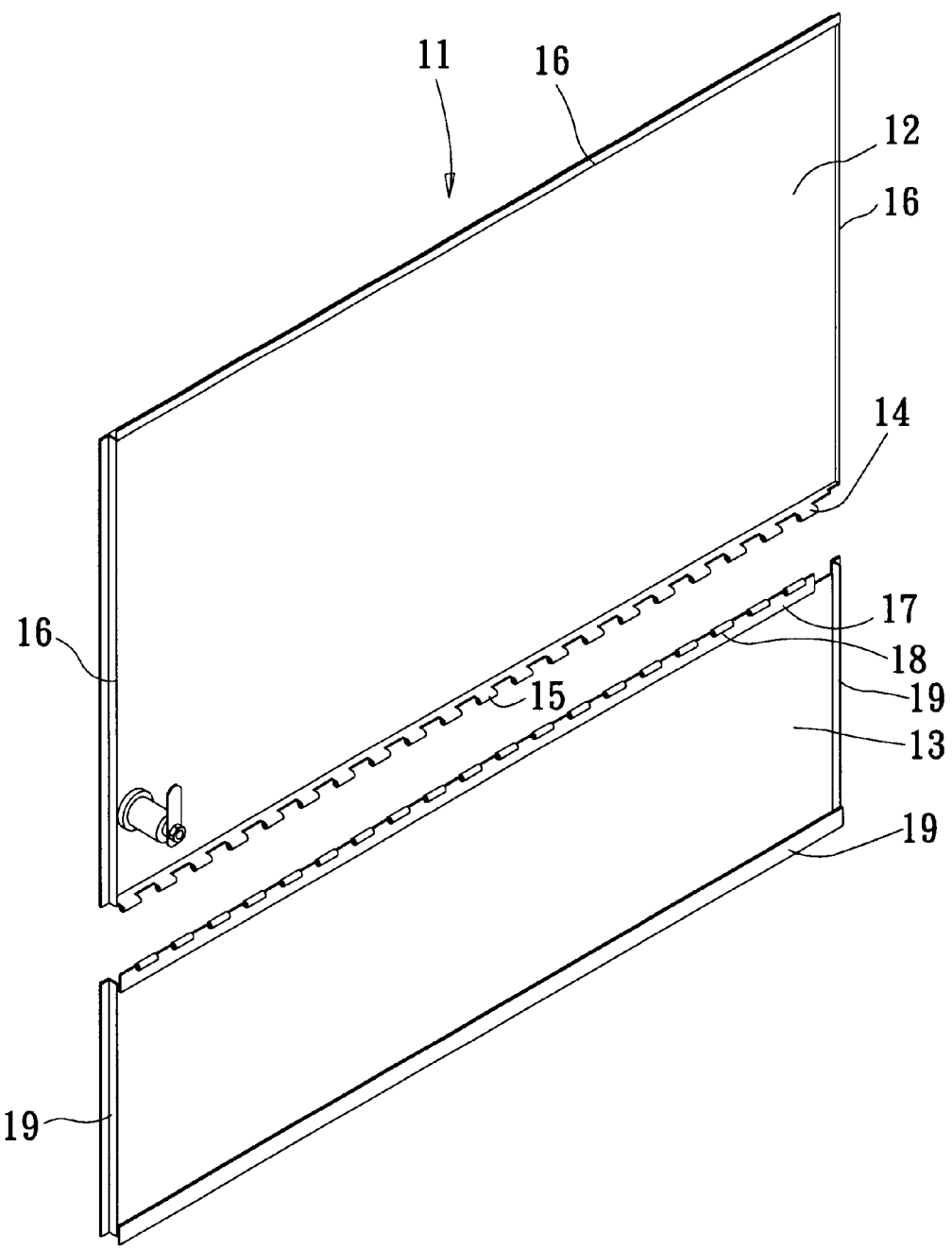
FIG. 5 an exploded perspective view of the movable door plate in the present invention.

With reference to FIGS. 2, 3 and 4, the computer casing of the present invention is illustrated herein. The computer casing 10 according to the present invention includes an oblong housing. In the present invention, at least one side of the computer casing 10 is installed with a movable door plate 11. This movable door plate 11 includes a first plate 12 and a second plate 13 (as shown in FIG. 5). The first plate 12 is installed at an upper side and is an oblong plate. A pivotal portion 14 is installed at the connection of the first plate 12 and the second plate 13. The pivotal portion 14 is formed by a plurality of sleeves 15 spaced arranged. The other three edges of the first plate 12 are bent as engaged portions 16 with an "L" shape.

The second plate 13 is installed at a lower side and is an oblong plate. A pivotal portion 17 is installed at the connection of the second plate 13 and the first plate 12. The pivotal portion 17 is formed by a plurality of sleeves 18 spaced arranged. The sleeves 18 of the second plate 13 are alternatively arranged with the sleeves 15 of the first plate 12. The other three edges of the second plate 13 are bent as engaged portions 19 with an "L" shape.

The first plate 12 and second plate 13 are connected through the pivotal portions 14 and 17 of the sleeves 15 and 18, respectively. Then, a pivotal shaft 20 passes through the sleeves 15 and 18 of the first plate 12 and the second plate 13 so that the first plate 12 and second plate 13 are pivotally connected. Thus, a movable door plate 11 is assembled.

As shown in FIGS. 2 and 4, an opening 21 is installed at another side of the computer case 10. The movable door plate 11 can be fixed at the inner sides of the four edges of the opening 21 in the computer casing 10 through the engaged portions 16 and 19 (as shown in FIGS. 3 and 4) for sealing the opening 21 at one side of the computer casing 10. Thus, by aforesaid components, the computer casing of the present invention is formed.

With reference to FIGS. 2 and 4, if the movable door plate 11 is desired to be opened, the pivotal portions 14 and 17 of the first plate 12 and the second plate 13, respectively, can be pushed outwards so that the first plate 12 and the second plate 13 are bent. Then, the engaged portions 16 and 19 of the first plate 12 and the second plate 13 will separate from the inner sides of the edges of the opening 21 on the computer casing 10 so that the movable door plate 11 is opened.

The movable door plate 11 of the computer casing 10 according to the present invention has a movable design, which can be opened quickly for maintaining, updating and expanding the elements within the computer. The movable door plate 11 of the present invention is fixed by embedding without any screw for locking and combining, and thus, the assembly and detaching works are easily.

In summary, the present invention has improved the defects in the prior art, such as the computer casing is fixed, the maintenance, updating and expansion are difficult.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A computer casino having an opening formed in a side thereof, wherein at least one movable door plate is removably installed in the opening as a closure therefore, the movable door plate including a first plate and a second plate disposed below the first plate, one edge of the first plate being hingedly connected to an adjacent edge of the second plate, remaining edges of each of the first plate and the second plate being formed with a respective L-shaped edge portion, the L-shaped edge portion of an upper edge of the first plate and the L-shaped edge portion of a lower edge of the second plate being respectively reversibly engagable with corresponding perimeter portions of the opening for selectively closing the opening.

2. The computer casing as claimed in claim 1, wherein each edge in the connection of the first plate and the second plate has a pivotal portion which is formed by a plurality of spaced hollow sleeves; the sleeves of the first plate are alternatively arranged and connected with the sleeves of the second plate, and a pivotal shaft serves to pass through the sleeves of the first plate and second plate so that the first plate and second plate are pivotally connected.

* * * * *